April 30, 1963  E. J. ROSS  3,087,795
HOT WIRE GAS DETECTOR AND INDICATOR

Filed Feb. 26, 1962

INVENTOR.
EDWARD J. ROSS
BY
Brown, Critchlow, Flick & Peckham.
ATTORNEYS.

United States Patent Office 3,087,795
Patented Apr. 30, 1963

3,087,795
HOT WIRE GAS DETECTOR AND INDICATOR
Edward J. Ross, Pittsburgh, Pa., assignor to Mine Safety Appliances Company, Pittsburgh, Pa., a corporation of Pennsylvania
Filed Feb. 26, 1962, Ser. No. 175,694
6 Claims. (Cl. 23—255)

This invention relates to a hot wire combustible gas detector and indicator, and more particularly to such an instrument that operates on the differential thermal expansion of two spring loaded wires, only one of which is affected by the presence of the combustible gas to be detected and measured.

Hot wire gas detectors of the type referred to have heretofore been subject to several disadvantages. One is that the wire is frequently stressed above its elastic limit at elevated temperatures, causing a permanent set in the wire. Another disadvantage is that the effects of variations in ambient conditions, such as temperature and applied voltage, are not adequately compensated for. A further disadvantage is that instruments of this type are most accurate at zero concentrations, and not at the critical concentrations, of the gas to be detected and measured.

Figure 1:
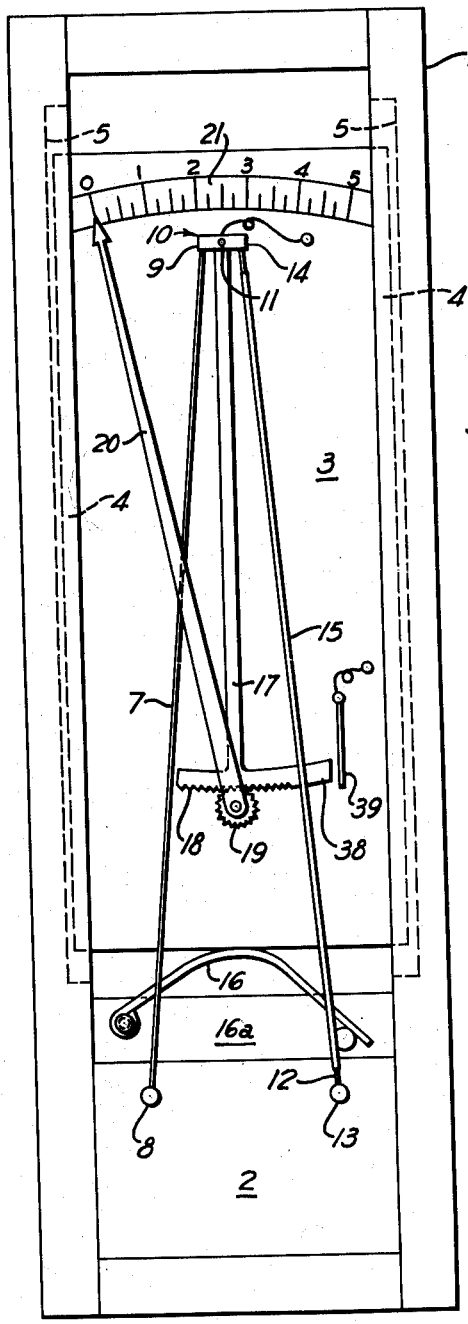
Figure 2:
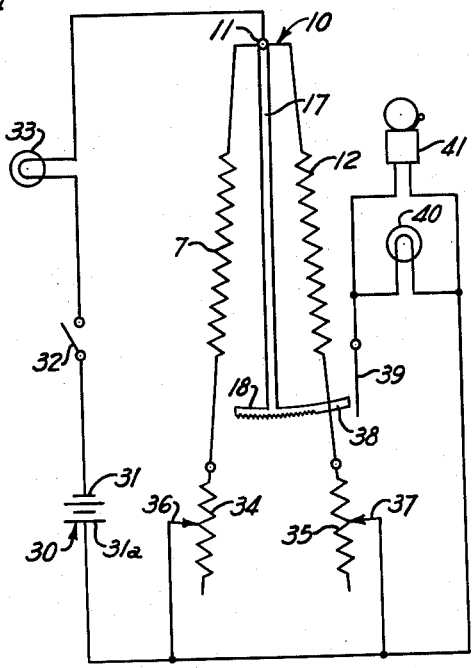

It is accordingly among the objects of the present invention to provide an instrument of the type referred to that will not have the foregoing disadvantages. Such an instrument will be described herein in connection with the accompanying drawings, in which FIG. 1 is a plan view of the mechanical features of the invention; and FIG. 2 is a wiring diagram showing the electrical connections between various parts shown in FIG. 1.

In accordance with this invention, the gas detector and indicator is provided with a pair of wire resistance elements of equal length having equal thermal expansion and electrical resistance characteristics. One wire is coated with a suitable catalyst, in accordance with well-known practices, to promote the oxidation of a combustible gas at its surface. The two wires have their outer ends secured to opposite sides of a pivoted member and their inner ends secured to a base, and means are provided for subjecting the wires to equal tension. The wires are connected in parallel to a source of electrical current. In the absence of a combustible gas, each wire when heated by the passage of current therethrough will expand by the same amount as the other wire, so that the pivoted element to which they are both connected will have no tendency to rotate. In the presence of a combustible gas, that wire which is coated with the catalyst will be heated to a higher temperature due to the heat generated by the oxidation of gas at its surface and will expand more than the other wire, causing the pivoted member to rotate. The pivoted member is connected to indicating means for measuring its rotation, that is, for measuring the differential expansion of the resistance wires. The instrument, to the extent so far described, does not differ materially from conventional instruments of this type. However, it is a feature of this invention that the indicator shall be in a null or balanced position, both electrically and mechanically for the specific gas concentration for which it is desired that the instrument have the most accurate response. This result is obtained by unbalancing the instrument at zero gas concentration, that is, in the absence of a combustible gas, by means of a variable resistance connected between the current source and the catalyst coated wire.

Referring to the drawings, the gas detector of this invention includes a frame 1, with a fixed base portion 2 and a sliding block portion 3. The latter is slidably retained within the frame by tongues 4 on the side of the block that fit into grooves 5 in the sides of the frame. A first resistance wire 7, preferably made of platinum, extends between a fixed point 8 on the base to one end 9 of a pivoted member 10, which is secured by a pivot 11 to the sliding block. A second resistance wire 12, having the same physical and electrical characteristics as the first wire is stretched between a fixed point 13 on the base and the other end 14 of the pivoted member 10. One of these wires, for example, wire 12, is coated with a catalyst 15, in a manner well-known to the art, and both wires are held under equal tension by a leaf spring 16, mounted on a rabbeted portion 16a of base 2. This spring presses against the bottom of the sliding block and urges it towards the top of the frame. Thus, in turn, subjects the wires 7 and 12 to equal tension between their connections to the pivoted member 10 (which is urged upwards relative to the frame by spring 16) and their fixed connections on the base 2. The pressure exerted by the spring is not large enough, however, to stretch either of the wires beyond their elastic limits when heated to the elevated operating temperatures contemplated in the use of this invention.

Fastened to the under side of pivoted member 10 is a lever arm 17, having a pinion segment 18 at its lower end. This pinion segment engages a spur gear 19, which is pivotally mounted on the sliding block and to which is connected an indicator wand 20. The upper end of this wand describes an arc over a fixed scale 21 attached to the upper portion of the sliding block.

The resistance wires 7 and 12 are connected in parallel across a source of direct current, such as battery 30. One pole 31 of the battery is connected through a switch 32 and a signal light 33 to the pivoted member 10 (which may be of metal supported on an insulated pivot 11) and thence to the upper ends of the wires 7 and 12. The lower ends of those wires are connected, respectively, through variable resistors 34 and 35 to the other pole 31a of the battery. Now it will be apparent that, if resistors 34 and 35 are adjusted by moving their sliders 36 and 37, respectively, until their resistances are equal, then, in the absence of a combustible gas, there will be no deflection of the wand when switch 31 is closed and current flows through wires 7 and 12. Since those wires are connected in parallel to the current source, through equal resistances, they will be heated to the same extent by equal currents flowing through them and will therefore expand lengthwise by the same amount. If this instrument were now operated in the usual way, it would be calibrated to indicate zero gas concentration under the conditions just described. Thereafter, in the presence of a combustible gas, which would be oxidized at the surface of the coated wire 12 and raise the temperature of that wire above that of the adjacent wire 7, wire 12 would expand lengthwise more than wire 7. Such a differential expansion would cause the wand to be deflected to the right. Any reading obtained under those conditions would not, however, be an accurate indication of the gas concentration, because, with wire 12 at a higher temperaure than wire 7, the resistances of the two wires would no longer be equal and the electrical current and the heating therefrom would no longer be the same in each wire. Similarly, the effect of the ambient temperature would be different on each wire, having a greater cooling effect on the hotter wire. Likewise, variations in the battery voltage would cause disproportionate fluctuations in the current flowing through each wire. The foregoing effects could be cumulative and would cast doubt on the accuracy of the instrument when used for its intended purpose.

The present invention is predicated on the recognition that, in a system of the type described, the effects of ambient conditions can be fully compensated for only when the system is balanced, or is at its null point, such as described above under the condition in which no combustible gas was present. The present invention achieves the same compensation in the presence of a combustible gas, for example, at the critical level of methane in the air, which is around 2½ percent, by balancing the system both mechanically and electrically at that gas concentration. This is done by means of the zero adjustment control 35, whereby the resistance in series with wire 12 is increased to the point that the temperature of that wire is the same as that of wire 7. The temperature of wire 7 is determined solely by the amount of current flowing through it, while the temperature of wire 12 is determined both by the amount of the current and by the heat of combustion generated in the oxidation of the combustible gas at its surface. The zero adjustment control 35 is, in effect, manipulated to compensate for the increase in temperature in wire 12 due to the heat of gas combustion at the surface of that wire. With the instrument so adjusted, that is, balanced, in the presence of a 2½ percent concentration of methane in air, it will be out of balance in the presence of air alone and at other concentrations of the combustible gas. The essence of this invention resides in balancing the system at the most critical gas concentration to be measured, assuring an accurate reading at that concentration. Variable resistor 34, on the other hand, serves as a calibration control.

In testing mine atmospheres, it is highly desirable that a definite alarm be given when, for example, the methane concentration reaches a critical level, such as 2½ percent. Such an alarm may be provided to energize a warning light or ring an alarm bell when the critical gas concentration is reached or exceeded. The electrical circuit for such an alarm may include the lever 17 and the pinion segment 18, the outer end 38 of the latter serving as a contact point that will engage a very light spring contact 39, to close a circuit to a signal light 40 and an alarm bell 41. When an alarm is not wanted, contact 39 and its associated circuitry can be omitted.

It is an advantage of the present invention that the instrument is most accurate at the desired critical point of gas concentration and may be readily adapted to the accurate measurement of various initial concentrations of the same or different combustible gases. Another advantage is that the catalyst treated wire has the same temperature as the other wire 7 at the critical gas concentration, is at a lower temperature than the other wire at lower gas concentrations, and is at a lower temperature than the catalyst treated wire of conventional instruments at all gas concentrations. As a result, neither wire is likely to be stressed beyond its elastic limit and acquire a permanent set.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. For use with a combustible gas detector of known type that includes a pair of heat expandable electrical resistance members having equal thermal expansion characteristics, in which the first of said resistance members alone includes a catalyst to promote the oxidation of combustible gas at the surface of said member, and that includes means for measuring differential linear expansion between the first and second resistance members, the improvement that comprises: a resistor connected in series with the first resistance member; a source of electrical current connected in parallel across (1) the first resistance member and the resistor and (2) the second resistance member; said resistor being effective to reduce the current flowing through the first resistance member by an amount proportional to the heat of combustion of the combustible gas at a defined critical concentration at the surface of said member, whereby at said critical concentration the first and second resistance members will be at the same temperature.

2. Apparatus according to claim 1, in which the first and second resistance members are of equal length at said defined critical gas concentration.

3. Apparatus according to claim 1 that also includes a variable resistor connected in series with the second resistance member for varying the current flowing through said member.

4. A combustible gas detector comprising two support members, one of them being slidably mounted on the other, a lever arm pivotally mounted on the first support member, the lever arm having lateral extensions adjacent its pivotal mountings, a pair of heat expandable electrical resistance wires having equal thermal expansion characteristics and with the first of said wires alone including a catalyst to promote the combustion of the gas to be detected, one end of each of the resistance wires being attached to a lateral extension of the lever arm in spaced relation to each other and on opposite sides of the pivotal mounting of the lever arm, the other end of each of the resistance wires being attached to the second support member, spring means between the two support members for subjecting the resistance wires to a predetermined tension, an indicator wand pivotally mounted on the first support member with its pivot adjacent the free end of the lever arm, means operatively connecting the free ends of that arm with the pivoted end of the indicator wand for rotating the latter, a resistor, a source of electrical current connected in parallel across (*a*) the first resistance wire and the resistor and (*b*) the second resistance wire, the resistor being effective to reduce the current flowing through the first resistance wire by an amount proportional to the heat of combustion of the combustible gas when present at a defined critical concentration at the surface of that wire, whereby at said critical concentration the first and second resistance wires will be at the same temperature.

5. Apparatus according to claim 4, in which the resistance wires are of equal length.

6. Apparatus according to claim 4 that also includes a second resistor connected in series with the second resistance wire.

References Cited in the file of this patent

UNITED STATES PATENTS

| | | |
|---|---|---|
| 2,645,564 | Tiffany | July 14, 1953 |
| 2,745,721 | Tiffany | May 15, 1956 |